United States Patent [19]

Bida

[11] Patent Number: 5,132,150
[45] Date of Patent: Jul. 21, 1992

[54] DEAD AIR FLUID PIPE INSULATION

[76] Inventor: Sam Bida, 2160 Crawdfors St., Ely, Nev. 89301

[21] Appl. No.: 616,252

[22] Filed: Nov. 20, 1990

[51] Int. Cl.⁵ .............................................. F16L 59/14
[52] U.S. Cl. .................... 428/36.8; 428/36.9; 428/60; 138/93; 138/99; 138/120; 138/155
[58] Field of Search ........................ 428/35.2, 36.9, 60, 428/492, 423.1, 368, 34.3

[56] References Cited

U.S. PATENT DOCUMENTS 3,095,337  7/1961  Chase .................................. 138/155
4,448,218  5/1984  Vetter .................................. 138/99

Primary Examiner—Ellis P. Robinson
Assistant Examiner—Rena L. Dye
Attorney, Agent, or Firm—Watson, Cole Grindle & Watson

[57] ABSTRACT

An insulating covering for pipes with an air inflatible flexible envelope having an inner and an outer skin, the inner skin adapted to fit loosely over the outer diameter of a pipe to be insulated and including respective male and female end portions adapted to respectively engage a female and male end portion of another envelope to form a continuous insulating cover for the pipe and an air valve mounted in the outer skin for the ingress and egress of air into the envelope thereby inflating the same to provide a substantially firm, self-supporting envelope not requiring any means of support when inflated other than the air encased within the envelope and surrounding the pipe and insulating the same from the ambient.

12 Claims, 1 Drawing Sheet

DEAD AIR FLUID PIPE INSULATION

FIELD OF THE INVENTION

This invention relates to the insulation of fluid pipes, and, more particularly, to the use of dead air as an insulator surrounding the fluid pipe and comprising an inflatable self-supporting housing with an inner skin loosely engaging the outer surface of a pipe and respective male and female terminals enabling connection of fluid pipe and insulator housing sections to form a continuous insulating pipe covering.

BACKGROUND OF THE INVENTION

The use of dead air as an insulating medium is well known, but known dead air insulating structures as applied to pipe insulation has various disadvantages such as being too bulky, difficult to engage and disengage from the pipe and requires structure in addition to the envelope containing the air for supporting the insulation around the pipe. Prior art pipe insulation employing dead air is also difficult to use with lengthy pipes without creating gaps in the insulation and is difficult to remove for inspection or repair of a given section of pipe.

SUMMARY OF THE INVENTION

The primary object of the invention is to provide an air-inflatable flexible, self-supporting envelope for enclosing a pipe carrying fluids to insulate the pipe from ambient temperatures A further feature of the invention is to provide such an envelope in individual sections which have a female and a male end such that the individual pipe sections can be mated to form a continuous insulated adjustable pipe line and provide the like type insulation for coupling pipe Tee's and accessory pipe fittings for transmission of fluids.

Another feature of the invention is the provision of an air valve in the outer skin of the envelope to control the ingress and egress of air into and out of the envelope section, as well as air control valves as needed in the envelope of the individual accessory parts.

And yet another feature of the invention is the provision of such an envelope which is self-supporting so as not to require any means of support when inflated other than the air encased within the envelope.

And still another feature of the invention is the provision of such an envelope which can be readily deflated and removed from the pipe section to enable repair or visual inspection thereof and subsequent replacement of the insulating air envelope.

The air-insulating envelopes of the invention are intended to be used to insulate pipes especially in those areas which are subject to severe cold or hot temperature climates. However, the air-insulating envelopes may of course be used in those geographical areas considered to have more moderate climates, but which experience temporary or seasonal climatical changes.

The air-insulating envelopes of the present invention have a wide range of applications. For example, in applications where the pipe to be insulated is outdoors and exposed to the ambient, such as in pipes providing water connections to house trailers which are generally located underneath the house trailers.

BRIEF DESCRIPTION OF THE DRAWING

The above objects, advantages and features of the invention are believed to be readily apparent from the following description of a preferred embodiment of the best mode of carrying out the invention when taken in conjunction with the accompanying drawings, wherein.

DETAILED DESCRIPTION

Figure 1:
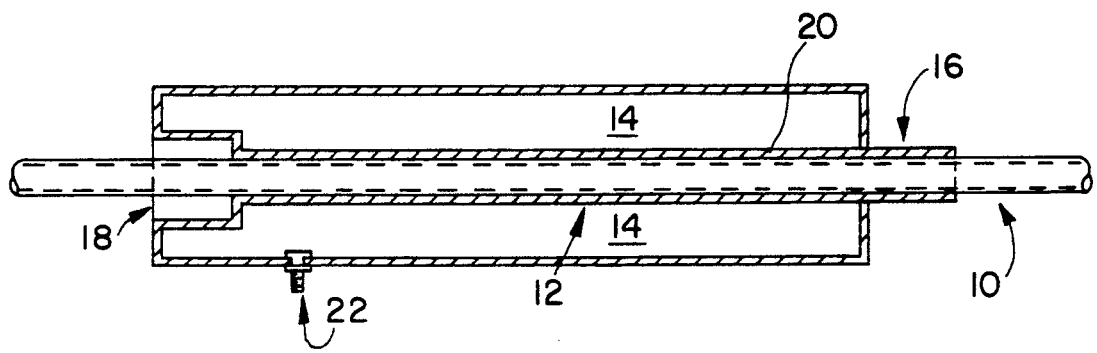
FIG. 1 is a side longitudinal sectional view of an air-insulating envelope encasing a section of pipe in accordance with the invention.

FIG. 1 shows a longitudinal section of water pipe 10 encased by an envelope 12 filled with air 14 and shaped to have a male end 16 and a female end 18. The envelope 12 is preferably made of a resilient material such as rubber so that an inner sleeve section 20 of the envelope loosely adheres to the outer surface of pipe 10 when the envelope 12 is filled with air. Inner sleeve section 20 has a diameter so that it can be easily slipped over the outer diameter of pipe 10, thereby enabling easy installation and removal of envelope 12 from pipe 10. Envelope 12 is provided with an air control valve 22 to control the ingress and egress of air into and out of envelope 12. Air control valve 22 may be similar to such valves used for inner tubes, for example Air-insulating envelope 12 is preferably made into sections that are of a length that is convenient to be used in any particular application. For a water pipe a length of approximately four feet, eight inches is easily handled with the main portion of envelope 12 being four feet and each of the male and female portions being four inches in length. The overall diameter of envelope 12 for the embodiment shown in FIG. 1 is approximately two and one-half inches. It is understood that these dimensions may vary in accordance with a given application. For example, the overall length of an envelope section 12 may be increased or decreased as the need arises, as can the effective diameter of the envelope to include more or less air depending on the degree of insulation desired.

Figure 2:
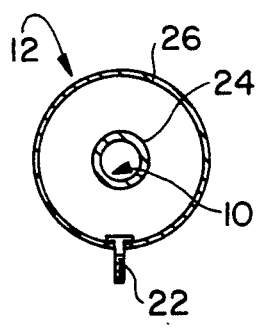
FIG. 2 is a a cross section of the air-insulating envelope and the pipe shown in FIG. 1.

FIG. 2 shows the manner in which the inner skin 24 of envelope 12 loosely engages the outer surface of the water pipe 10. Inner skin 24, for example, is approximately 1/16th inch thick as is outer skin 26. The envelope 12 is designed so that when fully inflated with air it is self-erecting without the need for internal struts or supports.

The male end 16 of envelope 12 is designed to snugly engage within female end 18 so that the individual sections of the envelope 12 can be strung together to form a continuous insulating surface over a pipe such as water pipe 10 illustrated in the preferred embodiment described herein.

Envelope 12 is preferably made of rubber or a flexible polyurethane substance.

Those skilled in the art will recognize that modifications and improvements can be made to the air-insulating described herein and the invention is not intended to be limited solely to that preferred embodiment, but the scope of the invention is to be determined by the following claims and the equivalents entitled to each of the components thereof.

What is claimed is:

1. An insulating covering for pipes, comprising:
    an air inflatable flexible envelope having an inner and an outer skin, said inner skin adapted to fit loosely over the outer diameter of a pipe to be insulated and including respective male and female end portions adapted to respectively engage a female and male end portion of another envelope to form a continuous insulating cover for said pipe; and an air valve mounted in said outer skin for the ingress and egress of air into said envelope thereby inflating the same to provide a substantially firm, self-supporting envelope not requiring any means of support when inflated other than the air encased within said envelope and surrounding said pipe and insulating the same form the ambient.

2. The insulating covering as claimed in claim 1, wherein said envelope is made of rubber.

3. The insulating covering as claimed in claim 1, wherein said envelope is made of a resilient flexible material.

4. The insulating covering as claimed in claim 1, wherein said female end portion comprises a circular cut-out portion exposing a portion of said pipe and said male portion is a circular portion loosely encircling said pipe.

5. The insulating covering as claimed in claim 1, wherein said flexible envelope is substantially 1/16th inch thick and the overall diameter of said envelope is substantially 4 inches for a 2 inch diameter pipe.

6. The insulating covering as claimed in claim 1, wherein said envelope is made of polyurethane.

7. An insulating covering for pipes, comprising:

a plurality of air inflatible flexible envelopes, each having an inner and an outer skin, said inner skin adapted to fit loosely over the outer diameter of a pipe to be insulated and each of said envelopes including respective male and female end portions adapted to respectively engage a female and male end portion of respective adjacent abutting envelopes to form a substantially continuous insulating cover for said pipe; and an air valve mounted in said outer skin for the ingress and egress of air into said envelope thereby inflating the same to provide a substantially firm, self-supporting envelope not requiring any means of support when inflated other than the air encased within said envelope and surrounding said pipe and insulating the same from the ambient.

8. The insulating covering as claimed in claim 1, wherein said envelope is made of rubber.

9. The insulating covering as claimed in claim 1, wherein said envelope is made of a resilient flexible material.

10. The insulating covering as claimed in claim 1, wherein said envelope is made of polyurethane.

11. The insulating covering as claimed in claim 1, wherein each of said female end portions comprises a circular cut-out portion exposing a portion of said pipe and each of said male end portions is a circular portion loosely encircling said pipe.

12. The insulating covering as claimed in claim 7, wherein said flexible envelope is substantially 1/16th inch thick and the overall diameter of said envelope is substantially 4 inches for a 2 inch diameter pipe.

* * * * *